Aug. 11, 1964    E. S. DIAZ    3,144,021
SYRINGE
Filed Nov. 10, 1960
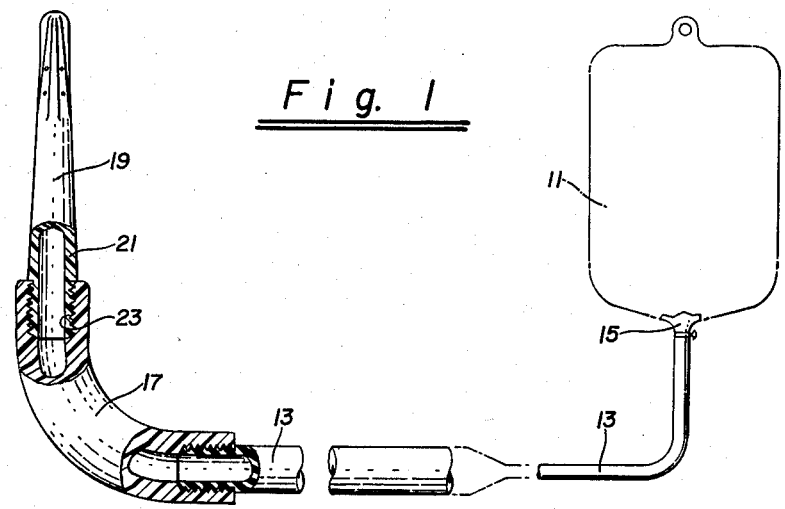
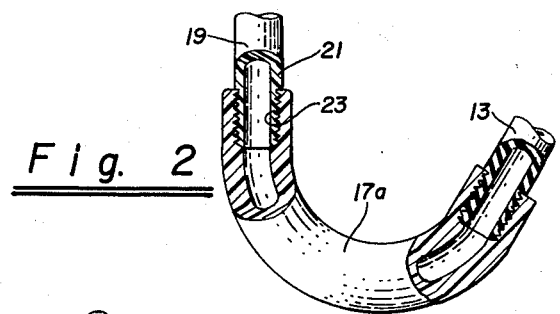
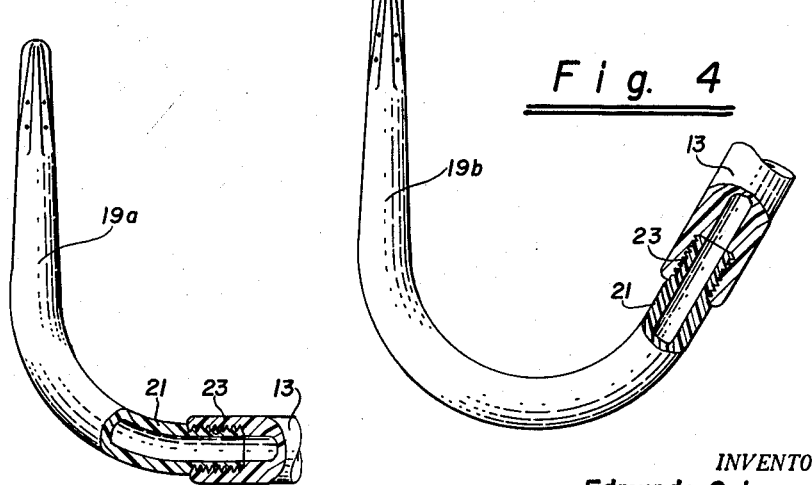
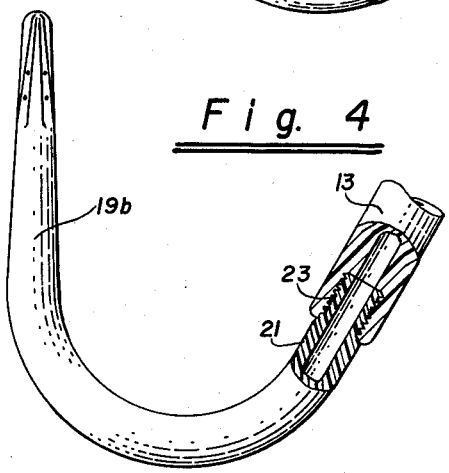
INVENTOR.
Edmundo Solorzano Diaz
BY
Attorneys

3,144,021
SYRINGE
Edmundo Solorzano Diaz, 174 10th Ave.,
San Francisco, Calif.
Filed Nov. 10, 1960, Ser. No. 68,541
2 Claims. (Cl. 128—227)

This invention relates to syringes and more particularly to fountain syringes used for hygenic douches and enemas.

In the normal construction of a syringe, the nozzle is a rigid or semi-rigid member constructed of hard rubber or plastic. The nozzle ordinarily has a straight cylindrical form, although some nozzles include bulbs or hooks at the discharge end. Generally, the nozzle is connected to a flexible tube or hose having its other end connected to a reservoir which may be in the form of a rubber bag or bottle.

In the use of such syringes, it is advantageous and convenient to have the flow of fluid easily controlled and without unwarranted interruption. In use, a substantial length of the tube normally depends in a somewhat vertical line from the reservoir and the nozzle extends vertically upward into the vagina or anus. The vertical position of the tube and the nozzle thus form the sides of a U and the remainder of the tube forms the underside of the U. If the remainder of the tube, that is that portion between the nozzle and the vertically depending portion, is held with an insufficient radius, a kinking condition occurs, and fluid flow is interrupted.

It is, therefore, a general object of this invention to provide an improved syringe.

It is a more particular object of this invention to provide a syringe wherein kinking of the flexible tube is prevented.

It is another object of this invention to provide a syringe wherein the nozzle includes a hook portion at its lower end whereby the tube connection is made approximately linearly.

It is further object of this invention to provide a syringe where an intermediate coupling between the nozzle and the tube is provided such that the connection to the tube is made in a somewhat linear fashion to prevent kinking thereof.

These and other objects of the invention will become more clearly apparent upon review of the following particular description in conjunction with the accompanying drawing in which:

FIGURE 1 is a cross sectional view of a syringe in accordance with one embodiment of this invention;

FIGURE 2 is an elevational view of a coupling in accordance with another embodiment of this invention;

FIGURE 3 is a view of a nozzle in accordance with still another embodiment of this invention; and FIGURE 4 is a view of a nozzle in accordance with still another embodiment of this invention.

Referring to FIGURE 1, the syringe shown includes a reservoir 11 which may be a rubber bag or bottle, a fliexible tube 13 connected to the reservoir 11 at 15. The other end of the hose 13 is connected to a coupling 17 which in turn is connected to the nozzle 19. The nozzle 19 includes a stem portion 21 and a hose coupling portion 23. The nozzle itself is disposed below the reservoir, whereby fluid may be fed to the nozzle by gravity.

The coupling 17 may be formed of a non-collapsible rigid or semi-rigid material, such as hard rubber or plastic.

As can be seen in FIGURE 1, the coupling 17 is in the approximate form of a right angle elbow, whereby the nozzle 19 is inserted into the vagina or anus in a vertical position and the hose 13 is horizontally coupled thereto, thus substantially reducing the possibility of kinking the hose.

In the embodiment shown in FIGURE 2, the elbow of the coupling 17a is formed at an angle less than 90° whereby when the nozzle 19 is in the vertical direction, the tube 13 may assume an angle closer to its normal vertical direction.

Referring to the embodiments of the invention as shown in FIGURES 3 and 4, it is seen that the coupling 17 itself is not absolutely necessary. Rather the nozzles 19a and 19b may be formed to provide the desired angle of connection with the hose 13. In each case, the nozzle 19a and 19b include a stem portion 21 and a tube receiving portion. The stem portion may be of the usual nozzle shape and may include a bulbous or hooked end (not shown). The tube receiving portion includes means for attaching to the tube 13 and is disposed at an angle to the stem portion. In the embodiment shown in FIGURE 3, the disposition of the tube receiving portion is about 90° from the stem, while in FIGURE 4, this angle is substantially less.

It is seen, therefore, that use of syringe in accordance with this invention substantially reduces the possibility of hose kinking. In the use of such syringes, especially in cooperation with sanitary seats, bidets or toilets, there is limited space for a return fold of the hose 13. However, with the sharp turns made by either the couplings or by the looped nozzles in accordance with the invention, the syringe may be used in the limited space available without the tendency of hose kinking.

I claim:

1. A syringe comprising a reservoir, a flexible tube and a nozzle, said reservoir adapted to provide gravity feed of fluid through said tube to the nozzle, and non-collapsible coupling means interposed between said tube and said nozzle, said coupling means comprising an elbow coupling threadedly received by both said tube and said nozzle whereby the coupling is manually separable from both the tube and the nozzle.

2. A syringe as defined in claim 1 wherein said elbow coupling has approximately a 90° angle.

References Cited in the file of this patent
UNITED STATES PATENTS

| | | |
|---|---|---|
| 1,166,033 | Yoder | Dec. 28, 1915 |
| 2,583,298 | Kowan | Jan. 22, 1952 |
| 2,626,000 | Booth | Jan. 27, 1953 |
| 2,768,624 | Lamb | Oct. 30, 1956 |
| 2,887,109 | Barrington | May 19, 1959 |

FOREIGN PATENTS

| | | |
|---|---|---|
| 627,801 | France | June 14, 1927 |